(12) United States Patent
Mills et al.

(10) Patent No.: US 7,304,296 B2
(45) Date of Patent: Dec. 4, 2007

(54) OPTICAL FIBER ASSEMBLY WRAPPED ACROSS GIMBAL AXES

(75) Inventors: James P. Mills, Tucson, AZ (US); David G. Garrett, Tucson, AZ (US); Wayne L. Sunne, Tucson, AZ (US); David J. Knapp, Tucson, AZ (US); Daniel W. Brunton, Tucson, AZ (US); David G. Anthony, Marana, AZ (US); Emmet R. Anderson, Tucson, AZ (US); Daniel C. Harrison, Tucson, AZ (US); Frank E. Smith, III, Tucson, AZ (US); Jim R. Hicks, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 58 days.

(21) Appl. No.: 11/243,562

(22) Filed: Oct. 5, 2005

(65) Prior Publication Data
US 2007/0075237 A1 Apr. 5, 2007

(51) Int. Cl.
*F41G 7/00* (2006.01)
(52) U.S. Cl. .............. 250/239; 250/234; 244/3.16
(58) Field of Classification Search ........... 250/239, 250/234; 356/149; 244/3.16; 372/33
See application file for complete search history.

(56) References Cited

U.S. PATENT DOCUMENTS 5,285,461 A * 2/1994 Krasutsky ............... 250/234
5,901,923 A 5/1999 Duden et al.
6,129,307 A * 10/2000 Deoms ...................... 244/3.16
6,873,893 B1 3/2005 Sanghera et al.
2007/0008514 A1 * 1/2007 Krasutsky .................. 356/4.01

OTHER PUBLICATIONS

Bae Systems, Infrared-Transmitting Fibers for Advanced IRCM Demonstrations, IRIS Paper 2001CMC02x, May, 2001, Nashua, New Hampshire.

* cited by examiner

*Primary Examiner*—Thanh X. Luu
*Assistant Examiner*—Tony Ko
(74) *Attorney, Agent, or Firm*—Noblitt & Gilmore, LLC (57) ABSTRACT

A control mechanism pins an optical fiber assembly on and off gimbal and between gimbals to route the assembly from an off-gimbal optical source across the gimbal axis/axes to an on-gimbal optical element so that the fiber assembly moves with the rotation of the gimbals. To accommodate a relatively large range of motion, the control mechanism is suitably configured to route the fiber assembly in a "U-shaped" loop with one end pinned off-gimbal in a stationary guide track and the other end pinned on-gimbal point in a rotating guide track so that the loose fiber assembly is constrained in the concentric tracks on and off gimbal. As the gimbal rotates, the loop seats onto one guiding track and peels off of the other guiding track while always maintaining its U shape. To accommodate a relatively small range of motion in other gimbal configurations, the control mechanism is suitably configured to pin one end of the fiber assembly off-gimbal and pass the fiber assembly directly over the gimbal where it is pinned on the other side of the gimbal. In a multi-gimbal pointer, the fiber assembly preferably exhibits different mechanical stresses as it crosses the different gimbals.

11 Claims, 8 Drawing Sheets

OPTICAL FIBER ASSEMBLY WRAPPED ACROSS GIMBAL AXES

BACKGROUND OF THE INVENTION

1. Field of the Invention

This invention relates to optical gimbals, and more particularly to the use of an optical fiber assembly wrapped across the gimbal axes to couple an off-gimbal light source to a telescope mounted on the innermost gimbal. The invention is particularly useful in Directed Infrared Countermeasures (DIRCM) systems that employ roll-nod gimbaled pointers to receive infrared (IR) radiation that is used to detect and track missiles and to transmit one or more infrared (IR) laser beams that are used to jam the seeker of a threatening IR-guided missile.

2. Description of the Related Art

The proliferation of shoulder-launched missiles known as MANPADS for "Man-Portable Air-Defense System" and their availability to terrorists present a real threat to military aircraft and particularly commercial aircraft. Estimates of the number of attacks on commercial aircraft vary, running as high as 43 hits on civilian aircraft—with 30 of these resulting in aircraft kills and the loss of nearly 1,000 lives—since the 1970s. More than half a million MANPADS have been delivered worldwide, and many of these are unaccounted for in legitimate inventories. These missiles currently use infrared seekers to track and lock-on to the aircraft. The missiles typically have a range of 1-8 km and can reach altitudes exceeding 12,000 feet. Historically, countermeasures range from evasion to flares to active IR jamming. Directed Infrared Countermeasures systems are being developed and installed on military aircraft and are being considered for use on commercial aircraft. The DIRCM includes a gimballed pointer that must detect, verify and track the threatening missile and then emit one or several modulated IR laser beams to jam the missile's IR seeker. The gimballed pointer typically slews on two orthogonal axes to track the incoming missile.

Northrop Grumman's Large Aircraft Infrared Countermeasures (LAIRCM) system uses AN/AAR-54(V) Missile Warning System (MWS) sensors, operating at ultraviolet wavelengths to detect the weapon's exhaust plume. The LAIRCM is built on the same platform as its predecessor Nemesis but uses a laser instead of a flashlamp. The LAIRCM uses free-space optics to optically couple the laser output to the gimbal. The optical path has significant optical losses, which reduces the output power of the modulated laser. Furthermore, the air-glass interfaces of the free-space components are highly susceptible to contamination and damage, which reduces the reliability of the system. In addition, the LAIRCM system can not support an additional UV laser to counter more advanced threats because the internal optics and transmit ports do not transmit UV.

BAE Systems has demonstrated a DIRCM system that is similar to the LAIRCM except that it uses an optical fiber to couple the laser to the gimbal (BAE Systems, Nashua New Hampshire IRIS Paper 2001CMC02x Infrared-Transmitting Fibers for Advanced IRCM Systems Demonstrations May 2001). The implementation of an "All-Fiber Path" was intended to improve output power and reliability. However, to achieve the necessary gimbal dual-axis rotation, three discrete fiber segments are coupled to each other using custom-made fiber optic rotary joints, which are capable of 360° rotation. The two short sections of fiber cable used inside the head are of larger core diameters equal to 200 and 250 μm to prevent potential loss due to rotational misalignment of the joints.

Using multiple fiber segments inside the gimbal resulted in the elimination of several actuated mirrors and servo loops which reduced complexity and could potentially enhance system reliability. However, piping the fiber through the two gimbal axes (roll and nod) mandated the use of non-continuous fiber segments coupled optically with optical rotary joints. The optical rotary joints have insertion and extraction losses at each interface between the fibers on the input and output, optical elements (input and output face) and at each air gap (minimum of three air spaces and six anti-reflection (AR) coatings per rotary joint). Each air gap is subject to contamination and, as experienced during the demonstration, damage to the AR coatings.

In a demonstration by BAE approximately 3.3 W of laser power was used in the 3-5 μm wavelength region. It was found that even at the modest power levels used in the BAE demonstration the high peak optical power from the laser caused damage to the AR coatings. However, the fibers were undamaged and continued to transmit the laser power. The rotary joints also introduce additional loading on the gimbal torquers resulting in reduced slew rates and increased settling times. This adversely impacted system performance, especially in multiple short shot engagements. The rotary joint limits any attempt to significantly downsize the gimbal to reduce aerodynamic drag due to mechanical limitations inherent in the design of the rotary joint, fiber fittings and fiber protective sheathing which limit fiber bend radius on each side of the fiber optic rotary joint.

Figure 3:
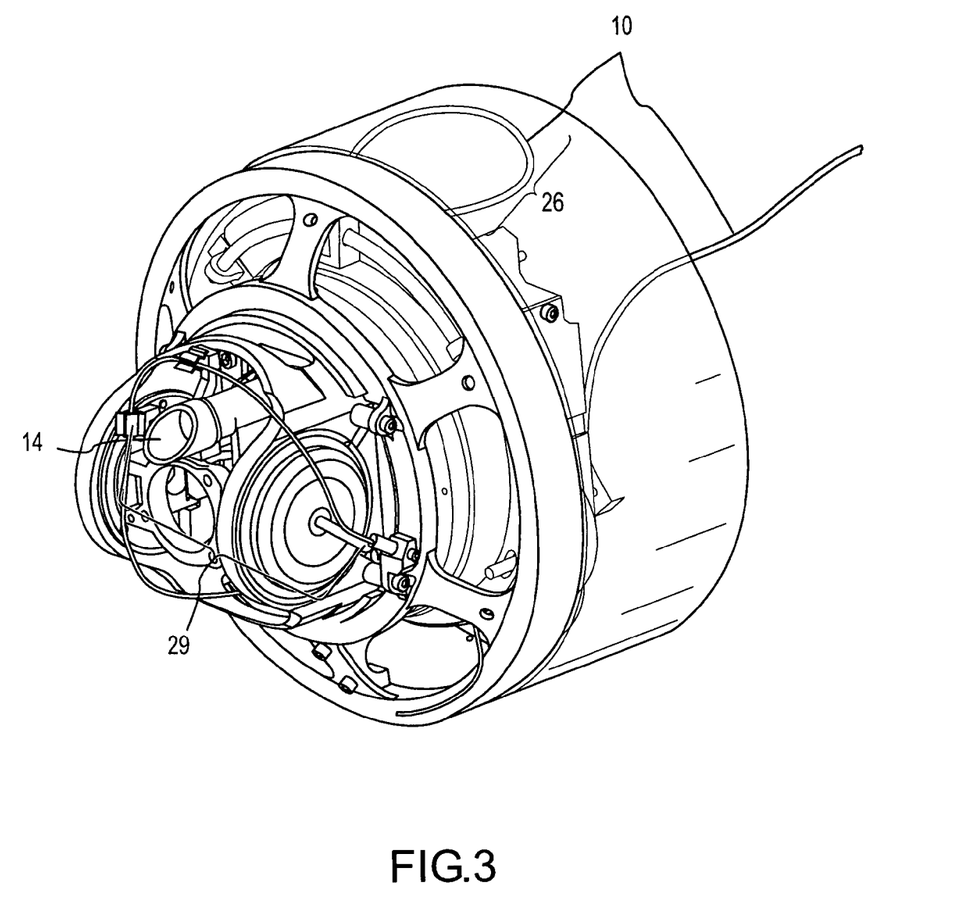
FIG. 3 is a diagram illustrating rotation of the gimbal about the nod axis.

U.S. Pat. No. 6,873,893 pertains to a jam head that is rotatable around at least two separate axes by first and second parts. A unitary infrared transmitting glass fiber of constant core diameter passes from a laser to and through the first and the second parts to convey an energetic infrared optical signal and an exit port through which the optical signal passes. FIGS. 3(a) and 3(b) illustrate a spool structure 70 which provides for storage of the fiber coil or cable when needed. FIG. 3(a) shows the spool structure 70 with glass fiber 40 loosely wrapped around and disposed on mandrel 72 passing through open slot 76 of bars 74, the fiber being loosely wrapped around the mandrel with slack fiber being in the slots where the fiber is disposed against the upper reaches of the slots. FIG. 3(b) shows the spool structure 70 tightly wrapped around the mandrel passing through open slots 76 of bars 74, the fiber being tightly wrapped around the mandrel with the fiber having no slack and disposed around the mandrel, leaving most of each open slot vacant. In short, FIG. 3(a) shows a relaxed glass fiber in a spool structure with the fiber slack stored whereas FIG. 3(b) shows a taut glass fiber in a spool structure with the fiber slack utilized for rotation. This spool structure is a complex mechanical structure that is likely to have reliability problems and also suffers from an excess of optical fiber. This extra length translates into extra optical losses of 0.2-1 dB per meter for a laser beam guided through the fiber.

SUMMARY OF THE INVENTION

The present invention provides a power efficient, reliable, compact, lightweight and inexpensive solution for optically coupling an off-gimbal optical source such as a laser beam to an on-gimbal optical element such as a telescope. The on-gimbal optical element can be mounted off the gimbal axis thereby preserving the central region of the gimbal for another optical path such as that used by a receiver. The technique can be adapted for gimbal motion in any one of the three axis of rotation, (e.g. roll, nod, and elevation) or any combination thereof. In the case of multi-axis rotation, the optical element is mounted on the innermost gimbal.

This invention uses a continuous optical fiber assembly (an optical fiber, one or more jackets around the fiber and a connector at each end of the fiber) that couples the off-gimbal optical source to the on-gimbal optical element. A fiber control mechanism routes the fiber assembly from the off-gimbal optical source across the gimbal axis/axes to the on-gimbal optical element so that the fiber assembly moves predictably with the rotation of the gimbal. For each gimbal, the control mechanism suitably pins one end of the fiber assembly off-gimbal and one end of the fiber assembly on-gimbal. Furthermore, the fiber assembly is suitably pinned as it crosses between gimbals so that the fiber assembly can move independently with each gimbal. The control mechanism routes the fiber assembly to (1) control the radius of curvature of the fiber assembly so as to be larger than a set minimum value to minimize stress on the delicate fiber, (2) accommodate the desired range of motion around each axis, (3) avoid entanglement and rubbing of the fiber assembly, (4) wrap the fiber assembly compactly around the gimbal and (5) avoid loading the gimbal motors. In multi-gimbal configurations, the fiber assembly may exhibit different mechanical stiffness as it cross the gimbal axes to accommodate varying mechanical requirements of the different gimbals.

In cases where a relatively large range of motion is required, the control mechanism is suitably configured to route the fiber assembly in a "U-shaped" loop with one end pinned off-gimbal in a stationary guide track and the other end pinned on-gimbal point in a rotating guide track so that loose fiber assembly is constrained in the concentric tracks on and off gimbal. As the gimbal rotates the loop seats onto one guiding track and peels off of the other guiding track while always maintaining its U shape. This embodiment maintains a minimum set radius of curvature, accommodates any range of motion only limited by the length of the fiber assembly, and keeps the fiber assembly compactly wound in the guide tracks where it cannot become entangled with the gimbal or other elements.

In other cases where a relatively small range of motion is required, the control mechanism is suitably configured to pin one end of the fiber assembly off-gimbal and pass the fiber assembly directly over the gimbal where it is pinned on the other side of the gimbal. The control mechanism routes the fiber assembly so that it maintains the minimum radius of curvature, does not rub against the nod gimbal and is not too stiff so as to burden the nod motor.

In an exemplary embodiment, a pointer for use in a DIRCM system includes a roll-nod gimbal having a receiver centrally located on the nod gimbal along the optical axis. The roll-nod gimbal slews to point the optical axis at an incoming missile to receive and track its IR signature. A continuous optical fiber assembly carries a laser beam from an off-gimbal laser across the roll-nod axes to a telescope mounted off-axis on the nod (innermost) gimbal. The telescope directs the laser beam at and jams the threat missile's IR seeker. Because the laser energy does not pass through the gimbal axes, the transmission of laser energy is decoupled from restrictions imposed by the receiver's free space optics and coupling methods. Different off-gimbal sources may be coupled to one or more telescopes on the nod gimbal using a plurality of fiber assemblies, using a single fiber assembly including a plurality of fibers or by coupling the laser beams into a single fiber. A fiber control mechanism routes the fiber assembly in a "U-shaped" loop around the roll axis with one end pinned off-gimbal and the other end pinned to the roll gimbal so that the loose fiber assembly is constrained in concentric guide tracks on and off gimbal. As the roll gimbal rotates, the loop seats onto one guide track and peels off of the other guide track while always maintaining its U shape. The fiber control mechanism then passes the pinned fiber assembly directly over the nod gimbal where it is pinned on the other side of the gimbal. To improve performance, the entire fiber assembly suitably may include a pliable inner jacket that allows the fiber to move flexibly over the nod gimbal. The portion of the fiber that forms the U loop (or the entire fiber) may be suitably provided with a stiffer intermediate jacket that presses the fiber into the guide tracks. The portion of the fiber assembly between the roll-nod gimbal and the off-gimbal laser suitably includes a protective outer jacket. As a result, the jacketed fiber exhibits different mechanical properties as it crosses over the gimbal and nod axes.

These and other features and advantages of the invention will be apparent to those skilled in the art from the following detailed description of preferred embodiments, taken together with the accompanying drawings, in which:

DETAILED DESCRIPTION OF THE INVENTION

The present invention provides a power efficient, reliable, compact, lightweight and inexpensive solution for optically coupling an off-gimbal optical source such as a laser beam to an on-gimbal optical element such as a telescope. The on-gimbal optical element can be mounted off-axis thereby preserving the central region of the gimbal for another optical path such as that used by a receiver. The technique can be adapted for gimbal motion in any one of the three axis of rotation, (e.g. roll, nod, and elevation) or any combination thereof. In the case of multi-axis rotation, the optical element is mounted on the innermost gimbal. For clarity we will use a roll-nod gimbal throughout to illustrate the invention. Throughout the description we refer to pinning an "end" of the fiber assembly on or off gimbal. The "end" is actually a point along the continuous fiber, and is only an "end" with respect to the particular gimbal that is being described. The true ends of the fiber are coupled to the off-gimbal source and the on-gimbal telescope.

Figure 1:
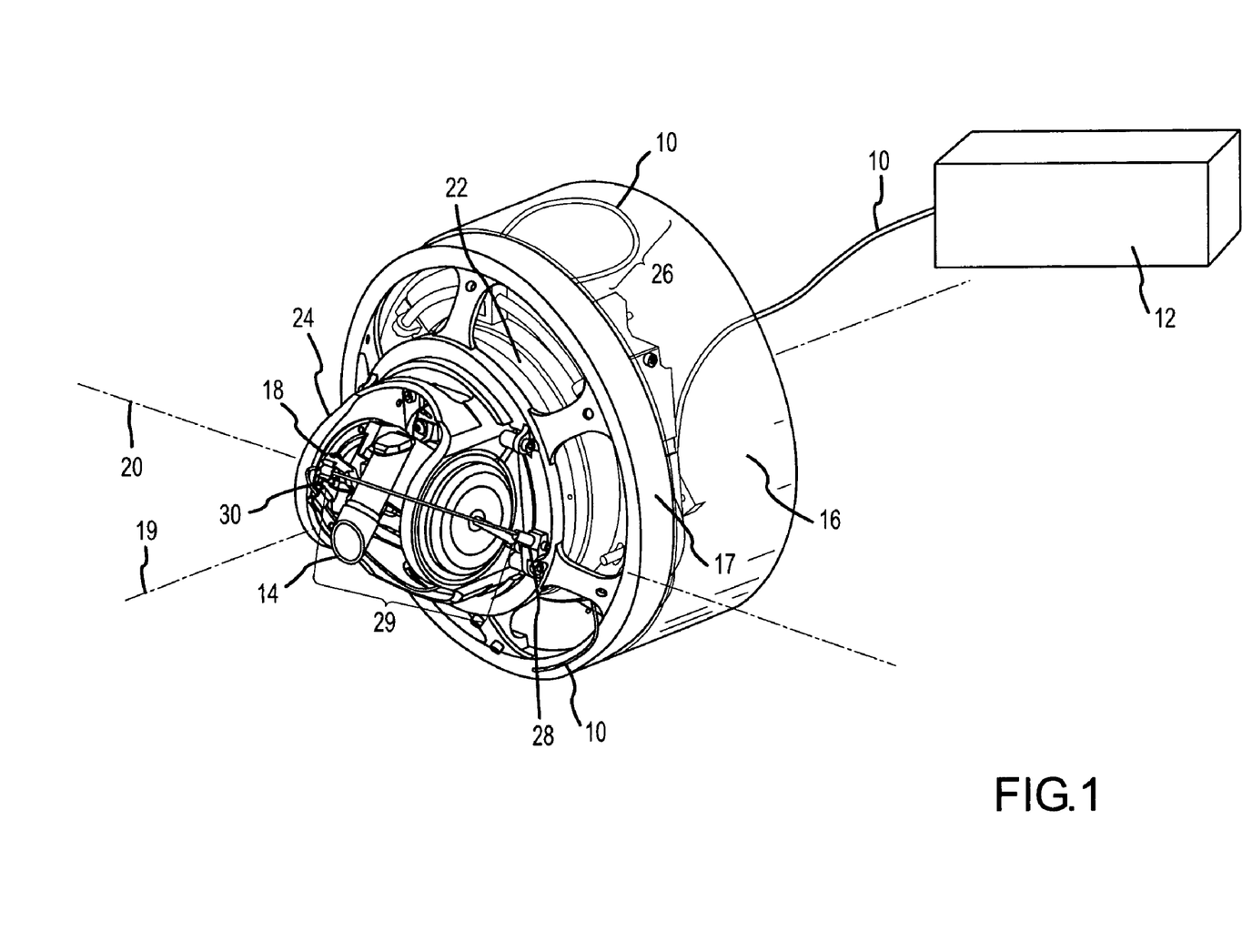
FIG. 1 is a diagram of an optical fiber assembly wrapped across a two-axis gimbal.

As shown in FIG. 1, a continuous optical fiber assembly 10 (an optical fiber, one or more jackets around the fiber and a connector at each end of the fiber) couples an off-gimbal optical source 12 to an on-gimbal optical element 14. A multi-element fiber assembly control mechanism (16, 17 and 18) routes the fiber assembly from the off-gimbal optical source across a roll axis 19 and a nod axis 20 to the on-gimbal optical element so that the fiber assembly moves predictably with the rotation of a roll gimbal 22 and a nod gimbal 24. For each gimbal, the control mechanism suitably pins one end of the fiber off-gimbal and one end of the fiber on-gimbal. Furthermore, the fiber is suitably pinned as it crosses between gimbals so that the fiber can move independently with each gimbal. The control mechanism routes the fiber assembly to (1) control the radius of curvature of the fiber assembly so as to be larger than a set minimum value to minimize stress on the delicate fiber, (2) accommodate the desired range of motion around each axis, (3) avoid entanglement and rubbing of the fiber assembly, (4) wrap the fiber assembly compactly around the gimbal and (5) avoid loading the gimbal motors.

Figure 2:
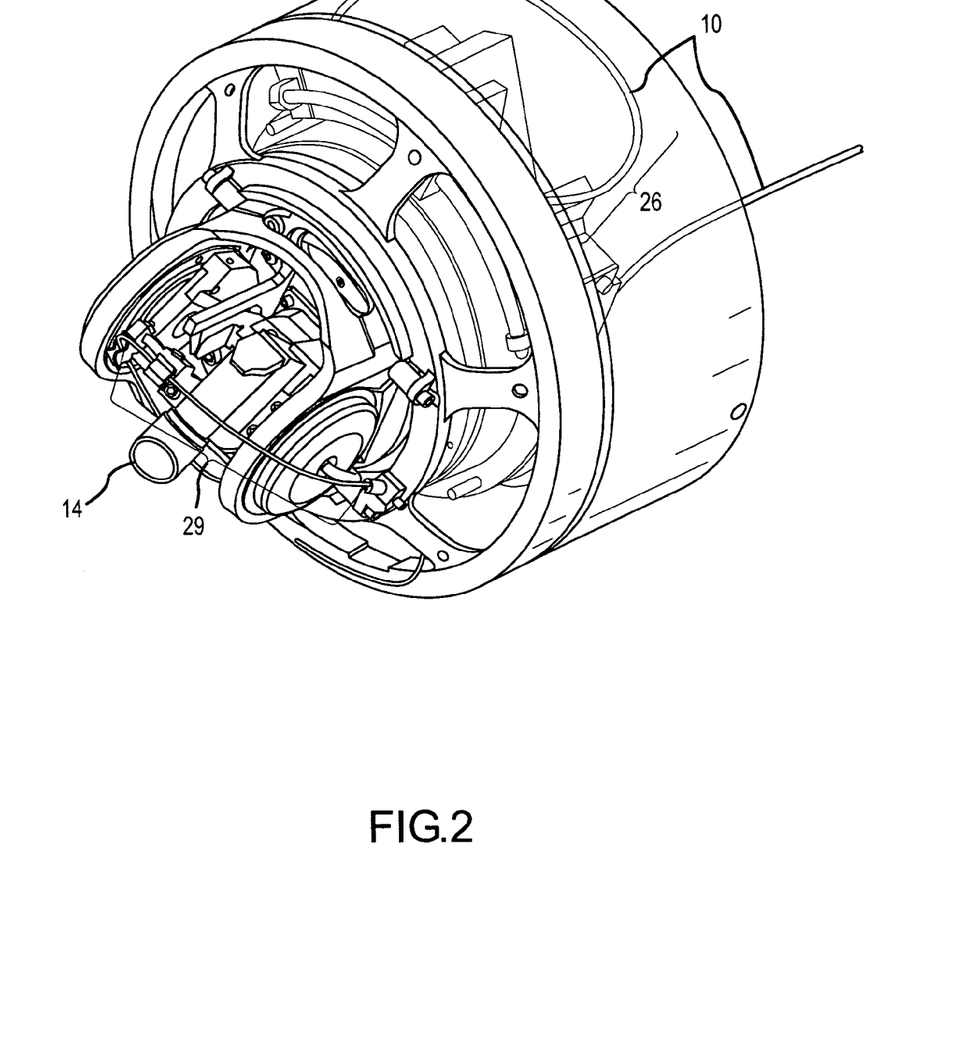
FIG. 2 is a diagram illustrating rotation of the gimbal about the roll axis.

To accommodate a relatively large range of motion, e.g. −180° to +180°, the control mechanism roll elements are suitably configured to route fiber assembly 10 in a "U-shaped" service loop 26 with one end pinned off-gimbal in a stationary guide track 16 and the other end pinned on-gimbal in a rotating guide track 17 so that the loose fiber assembly is constrained in the concentric tracks on and off gimbal. As roll gimbal 22 rotates, as shown in FIG. 2, loop 26 seats onto one guide track and peels off of the other guide track while always maintaining its U shape. The guide tracks maintain a minimum set radius of curvature, accommodate any range of motion only limited by the length of the fiber, and keep the fiber compactly wound in the guide tracks where it cannot become entangled with the gimbal or other elements.

To accommodate a relatively small range of motion, e.g. −30° to +30°, control mechanism nod element 18 is suitably configured to pin one end 28 of the fiber assembly off-gimbal (e.g., on rotating guide track 17) and pass the fiber assembly directly over the nod gimbal in an arc 29 where the other end 30 is pinned on the nod Gimbal. The fiber assembly is configured so that the fiber assembly maintains the minimum radius of curvature, does not rub against nod gimbal 24 and the fiber assembly is not too stiff so as to burden the nod motor.

Figure 4:
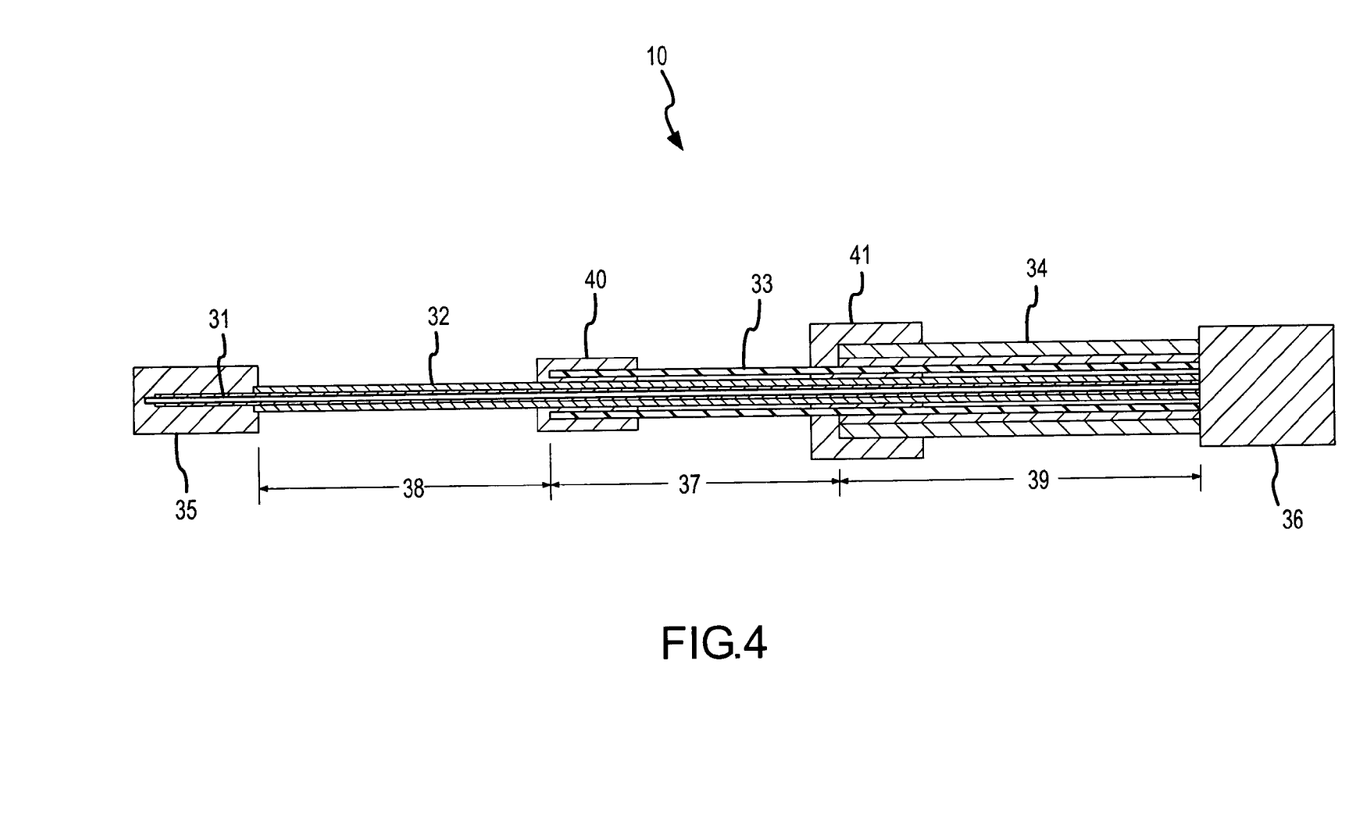
FIG. 4 is a simplified diagram of a jacketed fiber assembly.

As shown in FIG. 4, fiber assembly 10 includes an optical fiber 31, one or more jackets 32, 33, 34 around the fiber and connectors 35, 36 at each end of the fiber. The multi-jacketed fiber assembly exhibits different mechanical stiffness as it crosses over the different axes. In an exemplary embodiment, the entire length of fiber 31 is suitably enclosed in a pliable inner jacket 32 that allows the fiber to move flexibly over the nod axis. The portion 37 of the fiber(s) that forms the U loop is enclosed within another stiffer intermediate jacket 33 that presses the fiber into the guide tracks. As shown, jacket 33 suitably covers the length of fiber 31 except for the portion 38 that wraps the nod gimbal. A portion 39 of the fiber between the roll-nod gimbal and the off-gimbal laser suitably includes a protective outerjacket 34. Jackets 33 and 34 are suitably held in place with shrink tubes 40 and 41. Alternately, the variable stiffness characteristic may be obtained by (1) jackets 32 and 33 each having a different stiffness or (2) the addition of metal wire between jackets 32 and 33 in the U loop region. The importance of different fiber stiffness in different regions of the fiber can be appreciated by considering the U loop region of the fiber assembly. In the U loop region, the fiber assembly must be stiff enough to hold the fiber assembly into the grooves of the guide tracks 16 and 17. But this stiffness may be too much for another gimbal, as it would be in the exemplary nod axis. In general, the method of wrapping a fiber assembly (to include stiffness properties) across a gimbal will depend on the type of gimbal.

Although generally applicable in any application where there is a need to carry light from any off-gimbal source across the gimbal axes to any on-gimbal optical element such as a telescope, the continuous fiber assembly is particularly applicable in roll-nod Pointers for using in DIRCM systems. An IR receiver and its free-space optical path occupy the center of the nod gimbal and the on-axis optical path. The continuous fiber assembly provides a means for routing an off-gimbal laser to an on-gimbal telescope that is offset from the optical axis without interacting with the on-axis optical path. Furthermore, the continuous fiber assembly delivers power very efficiently and is lightweight, compact and reliable. Multiple off-gimbal sources may be coupled through one or more fiber assemblies to one or more on-gimbal telescopes.

Figure 5:
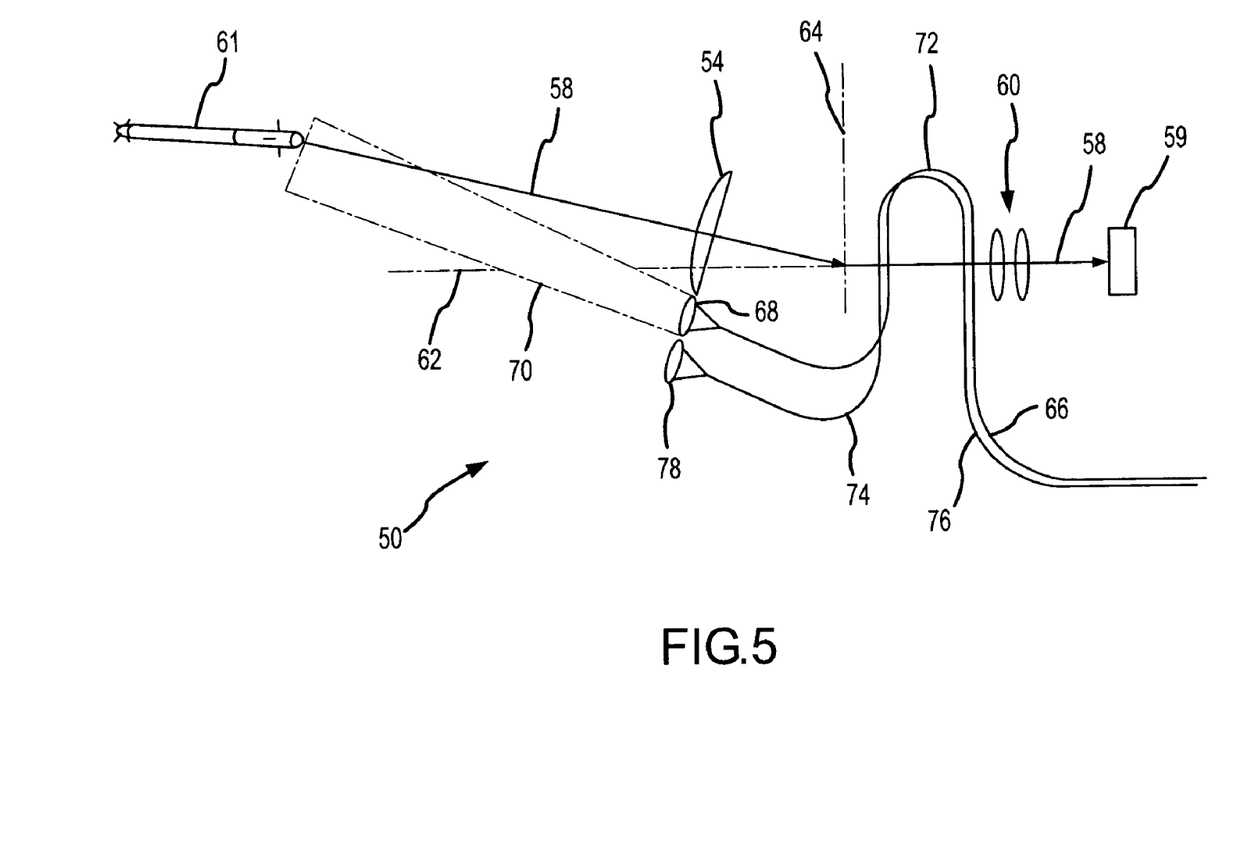
FIG. 5 is a simplified diagram of the optical fiber assembly wrapped across a roll-nod pointer for use in a DIRCM system.

As shown diagrammatically in FIG. 5, a pointer 50 for use in a DIRCM system includes a roll-nod gimbal having a telescope 54 (receiver) centrally located on the nod gimbal along an optical axis 58 for receiving IR radiation from the threat missile signature. A free-space optical system 60 couples the received IR image along optical axis 58 and across roll and nod axes 62 and 64, respectively, to a detector 59. The roll-nod gimbal slews around its axes to point optical axis 58 at a target (incoming missile 61) to receive and track its IR signature. In this particular embodiment, the roll gimbal rotates through at least 180° to +180° and the nod gimbal rotates through a more restricted range of at least −30° to +30°. A continuous optical fiber assembly 66 carries a laser beam from an off-gimbal laser (not shown) across the roll-nod axes to a telescope 68 mounted off-axis on the nod gimbal to direct the beam 70 at and jam the threat missile's IR seeker. As described above, the fiber assembly is routed in a "U-shaped" looped 72 around the roll axis and in an arc 74 directly over the nod gimbal.

In an alternate embodiment, another continuous optical fiber assembly 76 carries a second laser beam from another off-gimbal laser across the roll-nod axes to either the same telescope 68 or a different telescope 78. The off-gimbal lasers can be different IR lasers or possibly an IR laser and a UV laser and can be fired simultaneously or at different times. The two fiber assemblies may be enclosed together in an additional jacket between the input to the roll gimbal and the output of the nod gimbal. Alternately, the fiber assembly may include a plurality of fibers or the beams could be combined to travel through a single fiber.

Figure 6:
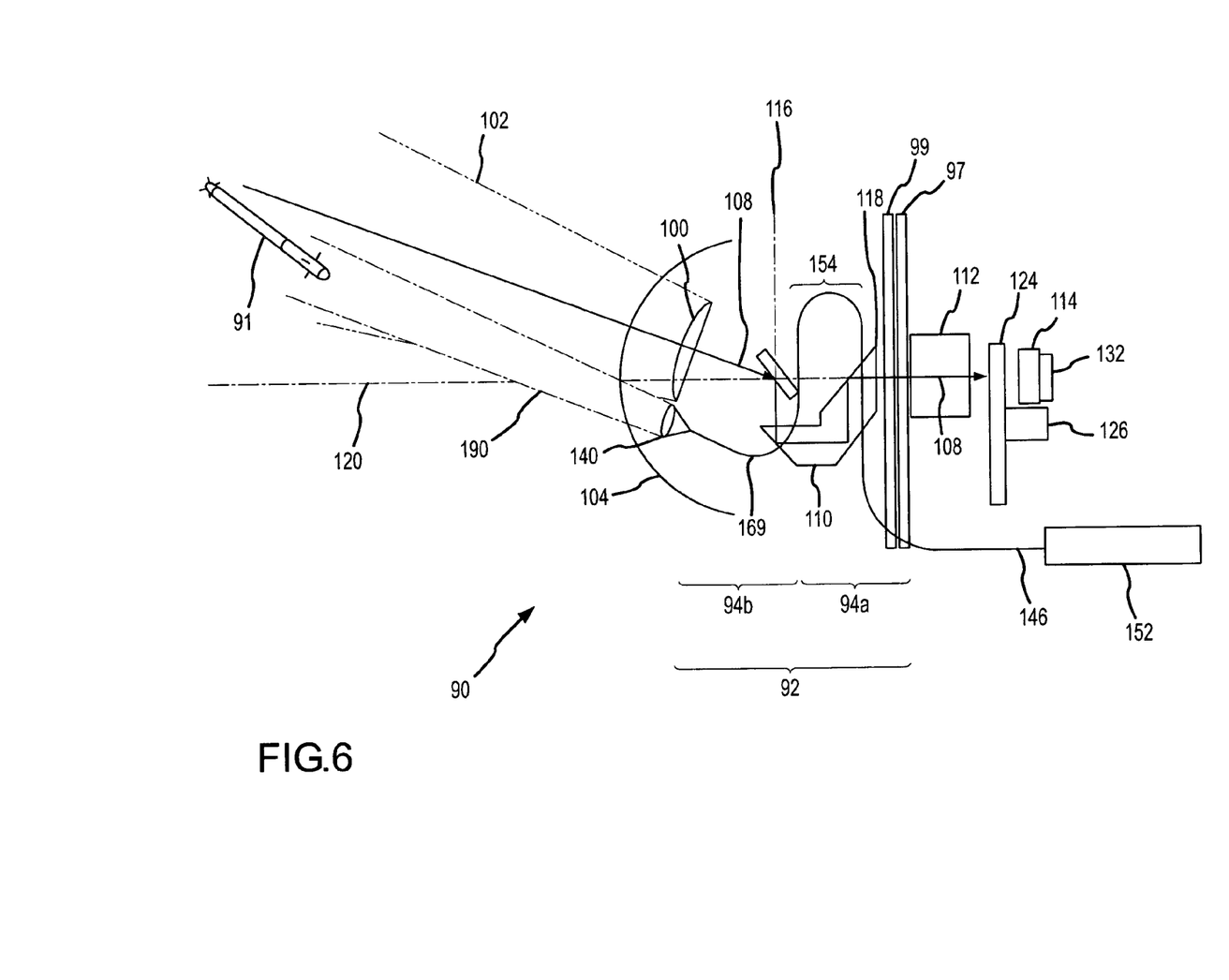
FIG. 6 is a simplified schematic diagram of a roll-nod pointer formed by modifying an AIM-9X Seeker to include the optical fiber assembly.
Figure 7:
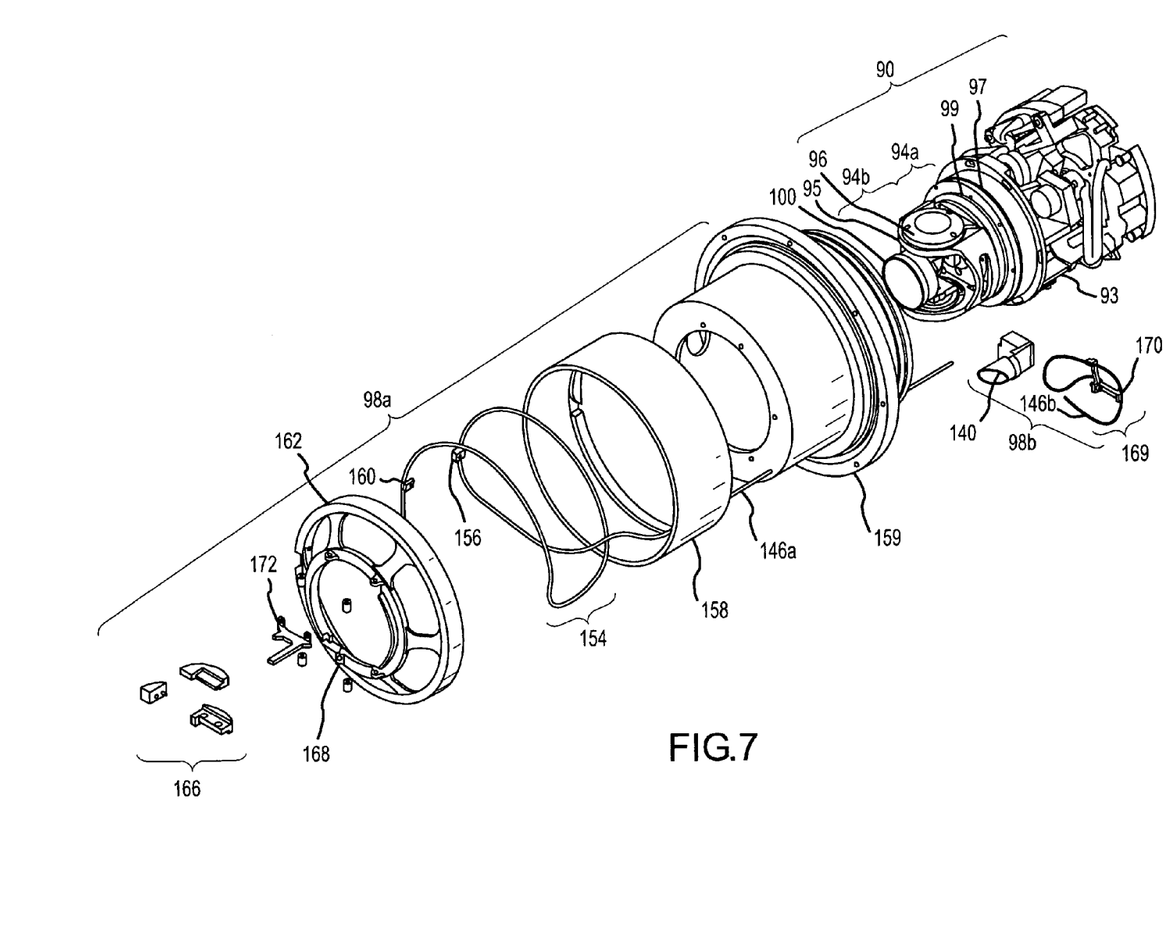
FIG. 7 is an exploded view the components added to the AIM-9X Seeker to implement the optical fiber wrap.
Figure 8:
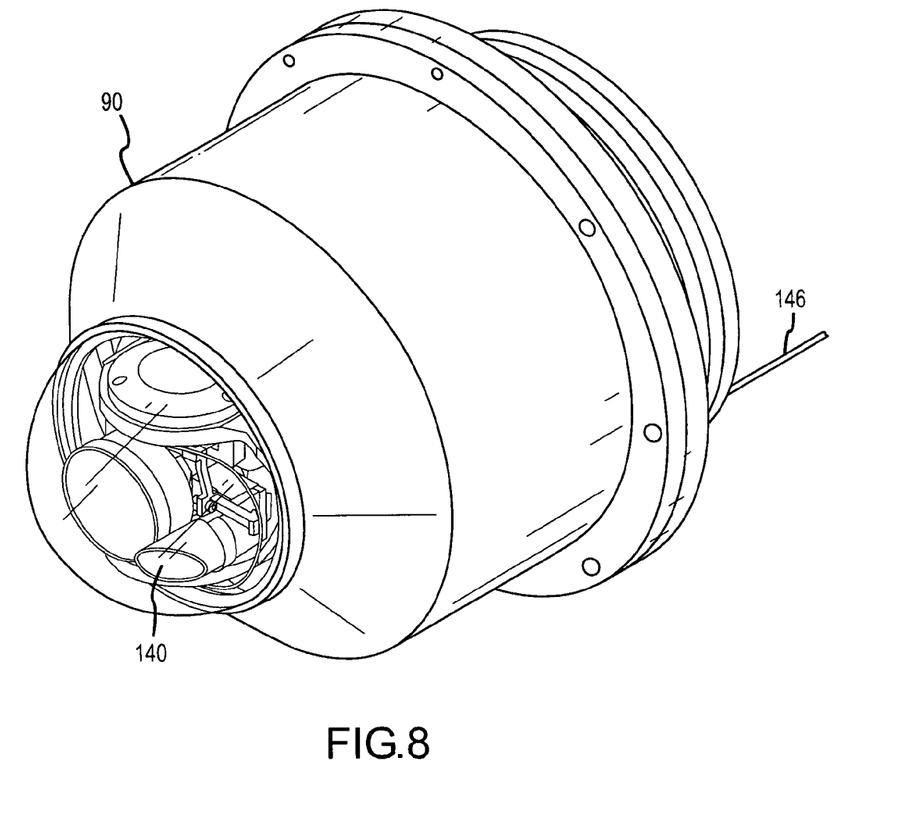
FIG. 8 is a perspective view of the roll-nod pointer.

As illustrated in FIGS. 6 through 8, an AIM-9X Imaging sensor 90 typically used as a missile seeker has been modified for use in the DIRCM system to detect, track, verify and jam a threat such as a shoulder launched missile 91. The AIM-9X Imaging Seeker is a proven product with volume manufacturing capacity, and thus is less expensive than designing and building a roll-nod pointer specifically for the DIRCM system. The seeker's roll/nod gimbal 92 includes all of the mechanical components forward of a bulkhead 93 that articulate in the roll and nod axes. Specifically gimbal 92 includes a roll gimbal 94a and a nod gimbal 94b, which include a nod rotating bearing assembly 95, a nod torquer 96, a roll bearing assembly 97 and a roll torquer 99, as well as some type of mounting platform (bulkhead 93). The optical components in the standard AIM-9X seeker head and the additional optical components 98a and 98b for transmitting a jam laser beam(s) are mounted on the gimbal platform (combination of 94a and 94b).

Infrared energy enters receive telescope 100 on nod gimbal 94b over a wide FOV 102, suitably several degrees, through a dome 104. Sapphire was selected as a suitable material for the AIM-9X dome for its scratch resistance and ability to withstand aerodynamic heating experienced during flight. The IR energy is collimated into a beam 108 and travels through a prism 110 and relay and focus optics 112 to a staring Focal Plane Array (FPA) 114. The prisms and optics are configured in such a way that they enable the seeker's gimbal to articulate in both roll and nod. As the energy in beam 108 exits the folded telescope it crosses a nod axis 116, enters the prism and is relayed to where it reaches sealed bulkhead 93 at point 118 and crosses a roll axis 120. Beyond this point the optics and FPA detector are body fixed. Once past the gimbal's roll axis, energy 108 enters relay and focus optics lens set 112. This set of optics forms the image on FPA 114 located at the image plane of the focus optics. Located between the focus optics and FPA is a spinning filter wheel 124 that contains multiple filtering elements that select the spectral band in which the seeker operates. Filter selection is software driven and can change in real-time with the changing engagement by controlling motor 126. Spectrally optimized energy is imaged on, for example, a 128 by 128 Indium Antimonide staring FPA 114, and read out by a readout circuit 132. The FPA is typically cooled by a Cryoengine (not shown) affording unlimited cooling during the mission.

Bulkhead 93 and the fixed components of the seeker aft of the roll gimbal allow for high Off Boresight Angle (OBA) operation within the traditional 3 inch Sidewinder dome diameter. The roll/nod gimbal configuration provides superior target tracking. The Off-Gimbal Inertial Seeker Assembly allows high slew rates. With the roll/nod gimbal detector 114 is off-gimbal. There are no cryogenic lines that must cross the gimbals. The reduced on-gimbal mass and minimal spring torque allow the gimbal to be controlled by a high bandwidth control loop that drives the roll/nod torquers enabling very high speed slewing and fast settling times for the seeker.

Imaging sensor 90 is modified for use in the DIRCM by outfitting it with the proper laser sources, fiber assembly, fiber control mechanisms and laser transmitters needed to jam the seeker on the inbound missile. Sapphire dome 104 transmits energy from the Ultraviolet through mid-infrared so the DIRCM can transmit laser energy that is in-band to the most advanced multi-color threats that operate in multiple portions of the spectrum including the Ultraviolet. Materials other than Sapphire such as Aluminum OxyNitride, may also provide the requisite mechanical and transmission properties. Existing and in development DIRCM systems can not operate at wavelengths from the near infrared through the visible and into the ultraviolet due to limits imposed by materials used in their optical systems.

The seeker's nod gimbal 94b is suitably fitted with a multiband infrared conformal optics laser transmitter telescope 140 attached off-axis to and aligned with the line-of-sight of folded telescope 100. Details of the conformal optics preferably used herein are provided in copending U.S. patent application Ser. No. 10/909,940 entitled "Windowed Optical System Having A Tilted Optical Element To Correct Aberrations", filed on Dec. 4, 2002 and U.S. Pat. Nos. 6,552,318; 6,313,951; 6,310,730 and 6,028,712, which are hereby incorporated by reference. The threat missile is centered in the track frame, laying the laser transmitter's optical line of sight onto the missile. The optical centerlines of the AIM-9X Infrared tracker and the laser transmitter are co-aligned. A continuous IR fiber assembly 146 is routed to couple laser telescope 140 to the output of an IR laser 152. The fiber assembly in FIG. 7 is shown in two pieces, 146a and 146b, for convenience of display. In reality, the fiber assembly is one continuous piece.

To accommodate a relatively large range of motion, e.g. −180° to +180° around the roll axis, the control mechanism routes fiber assembly 146 in a "U-shaped" service loop 154 with one end pinned with a clamp 156 off-gimbal in a stationary guide track 158 mounted on a support housing 159 around the roll gimbal and the other end pinned with a clamp 160 on-gimbal in a rotating guide track 162 so that loose fiber assembly is constrained in the concentric tracks on and off gimbal. As the roll gimbal rotates, loop 154 seats onto one guide track and peels off of the other guide track while always maintaining its U shape. The range of motion is constrained ultimately by the length of the service loop but is preferably constrained by stops (not shown). Counter weights 166 are suitably positioned on the roll gimbal to balance the gimbal in view of the additional components.

To accommodate a relatively small range of motion, e.g. −30° to +30° around the nod axis, the control mechanism pins one end of fiber assembly 146 with a clamp 168 off-gimbal (e.g., on the roll Gimbal) and passes the fiber assembly directly over the nod gimbal in an arc 169 where it is pinned with a clamp 170 on the other side of the nod gimbal. A hard stop 172 prevents the nod gimbal from rotating too far and hitting the telescope against the gimbal.

When directed to fire, IR laser 152 fires an IR laser jam beam 190 that passes through IR fiber 146, in the U-shaped loop around the gimbal axis and in the arc over the nod gimbal, to telescope 140 where the beam is emitted and transmitted through dome 104. Jam beam 190 is aligned with the seeker's line-of-sight on the target and has only a few milliradians of beam divergence. More sophisticated missiles can, once their IR seeker is jammed, switch to a UV/visible tracking mode. The pointer may be configured with an additional UV/visible laser as described above to counter these more sophisticated missiles.

As modified, the receive telescope 100, laser transmitter telescope 140 and fiber assembly 146 are mounted on nod gimbal 94b. These in turn are attached to the relay prism 110. This entire assembly is mounted on the roll axis 120. IR energy 108 received by the telescope is transmitted off the gimbal via prism 110 that is on roll gimbal 94a and rotates around roll axis 120, into off gimbal relay and focus optics 112 that forms the image on Focal Plane Array 114. In this configuration, the laser energy does not pass through the gimbal axes as is done in all the other systems. The use of a continuous fiber assembly 146 (the combination of 146a and 146b) decouples the transmission of the laser energy from restrictions imposed by conventional free space optics and coupling methods. The use of fibers also enables simple low-cost upgrades to be made by enabling the use of multiple fibers to add additional laser emissions to be in-band of advanced threat missiles.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A gimbaled optical pointer, comprising:

An outer gimbal that rotates around a first gimbal axis;

An inner gimbal that rotates around a second gimbal axis orthogonal to the first to point an optical axis in a multi-dimensional space defined by said first and second gimbal axes;

An optical element on the inner gimbal that is nominally aligned with the line-of-sight of the optical axis;

A fiber assembly including a continuous optical fiber; and

A control mechanism for routing the fiber assembly to carry light from an off-gimbal source across the first and second gimbal axes to the optical element so that the fiber assembly moves with the inner and outer gimbals as the gimbals rotate about their respective axis.

2. The pointer of claim 1, wherein said control mechanism pins the fiber assembly between said inner and outer gimbals so that the fiber assembly moves independently with the rotation of the inner and outer gimbals.

3. The pointer of claim 1, wherein the control mechanism pins in order a first portion of the fiber assembly off of the outer gimbal, a second portion of the fiber assembly on the outer gimbal, a third portion of the fiber assembly off the inner gimbal and a fourth portion of the fiber assembly on the inner gimbal and routes the fiber assembly between the first and second pinned portions and third and fourth pinned portions so that the fiber assembly maintains a radius of curvature of at least a specified minimum as the fiber assembly moves with the inner and outer gimbals, said fiber assembly having different mechanical stiffness between the first and second and the third and fourth portions.

4. The pointer of claim 1, wherein the control mechanism comprises for said outer and/or said inner gimbal an off-gimbal stationary guide track and an on-gimbal rotating guide track, said mechanism routing the fiber assembly in a U-shaped service loop with a first portion at one end of the loop pinned on the stationary guide track and a second portion at the other end of the loop pinned on-the rotating guide track so that loose fiber assembly is constrained in the concentric tracks on and off gimbal so that as the gimbal rotates the loop seats onto one guide track and peels off of the other guide track while always maintaining its U shape.

5. The pointer of claim 1, wherein the control mechanism for said outer and/or said inner gimbal pins a first portion of the fiber assembly off-gimbal and passes the fiber assembly directly over the inner gimbal where it is pinned on the other side of the inner gimbal so that the fiber assembly moves with gimbal and maintains a radius of curvature of at least a specified minimum.

6. The pointer of claim 1, wherein the control mechanism comprises for one of said outer and said inner gimbal, an off-gimbal stationary guide track and an on-gimbal rotating guide track, said mechanism routing the fiber assembly in a U-shaped service loop with a first portion at one end of the loop pinned on the stationary guide track and a second portion at the other end of the loop pinned on-the rotating guide track so that loose fiber assembly is constrained in the concentric tracks on and off gimbal so that as the gimbal rotates the loop seats onto one guide track and peels off of the other guide track while always maintaining its U shape; and for the other of said outer and said inner gimbal, a first clamp that pins the fiber assembly off-gimbal and passes the fiber assembly directly over the inner gimbal where a second clamp pins it on the other side of the inner gimbal so that the fiber assembly moves with gimbal and maintains a radius of curvature of at least a specified minimum.

7. The pointer of claim 6, wherein the fiber assembly has different mechanical stiffness across said first and second gimbal axes, said assembly comprising an inner flexible jacket that covers the length of the fiber and an intermediate jacket that covers the fiber in at least the U-shaped service loop to provide additional mechanical stiffness and press the fiber into the guides.

8. The pointer of claim 7, wherein the fiber assembly further comprises an outer jacket that covers the fiber between the outer gimbal and the off-gimbal source.

9. The pointer of claim 1, further comprising a receiver on the inner gimbal along the optical axis, said optical element being offset from the optical axis.

10. The pointer of claim 1, wherein a plurality of off-gimbal light sources are optically coupled to at least one said optical element on the inner gimbal through at least one said fiber assembly.

11. The pointer of claim 1, wherein the fiber assembly comprises a plurality of jackets covering differing lengths of the fiber so that the fiber assembly exhibits different mechanical stiffness across the first and second axes.

* * * * *